United States Patent
Chavez et al.

(10) Patent No.: US 9,123,171 B1
(45) Date of Patent: Sep. 1, 2015

(54) ENHANCING THE COUPLED ZONE OF A STEREOSCOPIC DISPLAY

(71) Applicant: zSpace, Inc., Sunnyvale, CA (US)

(72) Inventors: David A. Chavez, San Jose, CA (US); Arthur L. Berman, San Jose, CA (US); Jerome C. Tu, Saratoga, CA (US); Kevin D. Morishige, Los Altos Hills, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 14/335,455

(22) Filed: Jul. 18, 2014

(51) Int. Cl.
| | |
|---|---|
| *G06T 15/00* | (2011.01) |
| *G06T 19/20* | (2011.01) |
| *G06T 15/20* | (2011.01) |
| *H04N 13/04* | (2006.01) |

(52) U.S. Cl.
CPC ............ *G06T 19/20* (2013.01); *G06T 15/005* (2013.01); *G06T 15/205* (2013.01); *H04N 13/0425* (2013.01); *H04N 13/0468* (2013.01)

(58) Field of Classification Search
CPC H04N 13/02; H04N 13/0425; H04N 13/0257
USPC ............................................ 345/419; 348/51
See application file for complete search history.

(56) References Cited

U.S. PATENT DOCUMENTS

| | | | | |
|---|---|---|---|---|
| 6,629,065 | B1 * | 9/2003 | Gadh et al. ........................ 703/1 |
| 6,842,175 | B1 * | 1/2005 | Schmalstieg et al. ......... 345/427 |
| 6,879,322 | B2 * | 4/2005 | Iida et al. ...................... 345/419 |
| 7,002,585 | B1 * | 2/2006 | Watanabe et al. ............. 345/475 |
| 7,324,121 | B2 * | 1/2008 | Young ............................ 345/689 |
| 7,536,655 | B2 * | 5/2009 | Abe et al. ...................... 715/848 |
| 7,571,084 | B2 * | 8/2009 | Smith et al. ....................... 703/8 |
| 8,023,725 | B2 * | 9/2011 | Schwartzberg et al. ...... 382/154 |
| 8,050,491 | B2 * | 11/2011 | Vaidyanathan ............... 382/154 |
| 8,253,731 | B2 * | 8/2012 | Hoguet ......................... 345/419 |
| 8,736,674 | B2 | 5/2014 | Hovanky |
| 8,773,425 | B2 * | 7/2014 | Reghetti et al. ............... 345/419 |
| 8,890,864 | B2 * | 11/2014 | Seol et al. ..................... 345/419 |
| 2012/0075435 | A1 | 3/2012 | Hovanky |
| 2012/0300044 | A1 | 11/2012 | Thomas |

* cited by examiner

*Primary Examiner* — Phu K Nguyen
(74) *Attorney, Agent, or Firm* — Meyertons Hood Kivlin Kowert & Goetzel, P.C.; Jeffrey C. Hood; Mark S. Williams

(57) ABSTRACT

Systems and methods for calibrating a three dimensional (3D) stereoscopic display system may include rendering a virtual object on a display of a 3D stereoscopic display system that may include a substantially horizontal display. The virtual object may be geometrically similar to a physical object placed at a location on the display. At least one dimension of the virtual object may be adjusted in response to user input. The adjustment may be such that the at least one dimension of the virtual object is approximately the same as a corresponding at least one dimension of the physical object.

21 Claims, 10 Drawing Sheets

ENHANCING THE COUPLED ZONE OF A STEREOSCOPIC DISPLAY

TECHNICAL FIELD

This disclosure relates to the field of digital display, and more particularly to calibration of a stereoscopic display system for improved user experience.

DESCRIPTION OF THE RELATED ART

Three dimensional (3D) displays (actually, simulated 3D, e.g., via stereo display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255.

3. Panel—This component is the display itself, typically a liquid crystal display (LCD), but other displays are possible, and takes as input the video levels (e.g., for R, G and B) output from the scaler for each pixel, and converts them to voltages, which are then delivered to each pixel on the display. The panel itself may modify the video levels before converting them to voltages.

The video chain generally modifies the video levels in two ways that have associated shortcomings for stereo displays, specifically, gamma correction, and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, for each video frame there are two images—right and left. The right image must be delivered to only the right eye, and the left image must be delivered to only the left eye. In a time sequential stereo display, this separation of right and left images is performed in time, i.e., the left and right images are presented sequentially, and thus, contains some time-dependent element which separates these two images. There are two common architectures.

The first architecture uses a device called a polarization switch (PS) which may be a distinct (separate) or integrated LC device or other technology switch, which is placed in front of the LCD panel (or any other type of imaging panel, e.g., an OLED (organic light emitting diode) panel), a plasma display, etc., or any other pixelated panel display used in a time-sequential stereo imaging system, specifically, between the display panel and the viewer, as shown in FIG. 2. The purpose of the PS is to switch the light transmitted from the display panel between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

This allows achievement of the stereo effect shown in prior art FIG. 3. As may be seen, the top portion of the figure shows the (display) panel switching between a left image and a right image. Synchronous with the panel switching, the PS is switching between a left state and a right state, as shown. These two states emit two corresponding orthogonal polarization states, as mentioned above. As FIG. 3 further shows, the system includes stereo eyewear that is designed such that the left lens will only pass the left state polarization and the right lens will only pass the right state polarization. In this way, separation of the right and left images is achieved.

The second conventional architecture uses stereo shutter glasses, which replace (or integrate the functionality of) the PS and eyewear. In such systems, each eye is covered by an optical shutter, which can be either open or closed. Each of these shutters is opened and closed synchronously with the display panel in such a way that when the left image is shown on the display, only the left eye shutter is open, and when the right image is shown on the display, only the right eye shutter is open. In this manner, the left and right views are (alternatingly) presented to the user's left and right eyes, respectively.

Coupled Zone

As used herein, the term "coupled zone" refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses (monoscopically) on the object. In this sense, both eyes focus and converge on the object, thus focus and convergence are "coupled."

In contrast, as shown in prior art FIG. 5, when looking at a 3D stereoscopic display, focus must always remain on the 3D stereoscopic display, whereas the eyes must converge at various depths in order to visualize, or see, the 3D illusion. Thus, focus and convergence appear to "de-couple." Note that when focus and convergence de-couple, eye strain may develop if focus and convergence remain de-coupled for a period of time which may lead to discomfort for the viewer.

However, as shown in prior art FIG. 6, there is a coupled zone that is a physical volume which may extend in front of and behind a 3D stereoscopic display, in which focus and convergence remain coupled. In other words, there is a zone based on the human eye's natural depth of field where focus and convergence may not be fully coupled but in which objects may be viewed for an extended period of time (e.g., minutes to hours) without resulting eye strain. Put another way, the "coupled zone" of a 3D stereoscopic display may refer to volume defined by a user's viewing angle, the size of the 3D stereoscopic display, and the distances in front of and behind the 3D display in which a user may view displayed objects for an extended period of time without developing eye strain. Thus, the coupled zone of a particular 3D stereoscopic display may also be referred to as the "comfort zone" of the particular 3D stereoscopic display, i.e., the physical volume in which a user may view virtual images for an extended period of time without experiencing eye strain, and thus, discomfort.

Additionally, users of stereoscopic display systems may experience discomfort if the stereoscopic display system is improperly adjusted or the presentation of the 3D content is improperly formatted. In other words, a challenge to the designers of stereoscopic display hardware and software is to provide the user stereo imagery that is comfortable to view within a given user space (the comfort zone) and for an extended period of time.

The prior art contains a great deal of discussion on physiological and psychological factors and limits related to achieving so-called stereo comfort. One such factor is the maximum values of parallax in and out of the plane of the screen. Other factors include the allowed tolerances on the variation in size, orientation, color, brightness, texture, and the like, of equivalent objects in the two images of the stereo pair.

It is generally necessary that all the factors referred to above be properly adjusted to produce an image that has good stereo comfort. Note, however, that to achieve such comfort, it may be necessary to assure that the adjustments are optimized appropriately for each individual user.

As shown in FIGS. 7-9, user specific adjustments may include interpupillary distance (FIG. 7), the distance alone a line from the user's eye to an object on the display surface (FIG. 8, note that the user's eye is further from the display surface than retro-reflective targets on the glasses), and the distance in the plane of the user's face by which the retro-reflective targets are not coincident with the pupil of the user's eyes (FIG. 9), among other user specific adjustments.

Yet another challenge in the design of a stereoscopic display system is to assure an accurate 1:1 geometrical correspondence between virtual objects and the real, physical space. There are currently only limited methods and processes in the prior art that are used in stereoscopic displays to make user specific stereo comfort adjustments and to ensure accurate 1:1 geometrical correspondence between the 3D imagery and the real physical space. There is, therefore, a need for improved methods and processes to address these issues.

SUMMARY

Various embodiments of a system and method for calibrating a three dimensional (3D) stereoscopic display system are presented. The system may include at least one display and at least one processor coupled to the display. In one embodiment, the system may further include a user head tracking system and a user input device. The processor may be configured to perform or implement the techniques disclosed herein. Additionally, the method may be implemented on a computer or stored as program instructions on a computer readable memory medium. The method may operate as follows.

In an exemplary embodiment, a virtual object may be rendered on a display of a 3D stereoscopic display system. In one embodiment, the display may be substantially horizontal and the virtual object may be geometrically similar to one or more physical objects placed at a location on the display, i.e., may have the same shape but possibly a different size. Note that the physical object, in one embodiment, may be at least partially opaque. In another embodiment, the physical object may be a wireframe construction, and therefore, may be partially transparent. As used herein, the terms "physical" and "real" are used synonymously and may be used interchangeably, and thus, a "real object" is a "physical object".

At least one dimension of the virtual object may be adjusted in response to user input. The adjustment may be such that the at least one dimension of the virtual object may be approximately the same as a corresponding at least one dimension of the physical object(s). The adjustment may be performed after a user has adjusted orientation and/or position of the physical object(s), the virtual object, or both, such that the virtual object and physical object are approximately adjacent with approximately the same orientation.

In one embodiment, the one or more physical objects may be two identical physical objects. The adjustment may be performed after a user has adjusted orientation and/or position of the two identical physical objects or the virtual object such that the virtual object is between the two identical physical objects, and each of the two identical physical objects is approximately adjacent to the virtual object with approximately the same orientation.

In one embodiment, the user may superimpose the virtual object over the physical object by aligning a vertex of the virtual object with a corresponding vertex of the physical object. Thus, a vertex of the virtual object may be substantially coincident with the corresponding vertex of the physical object. The method may adjust a dimension of the virtual object in response to user input dragging another vertex of the virtual object, such that the other vertex of the virtual object is substantially coincident with a corresponding other vertex of the physical object.

In an embodiment where the physical object is a wireframe (construction), the adjustment may be performed after a user has adjusted orientation and/or position of the wireframe or the virtual wireframe such that the virtual wireframe is superimposed over the physical wireframe, where corresponding first vertices of each are substantially coincident. In such embodiments, adjustment of the dimension of the virtual object may include scaling the virtual wireframe in response to user input dragging a second, or other, vertex of the virtual wireframe such that the second or other vertex is substantially coincident with a corresponding second or other vertex of the physical wireframe (object).

In further embodiments, the location of the physical object may be a first location, and the method may further include repeating rendering and adjusting the virtual object for each of one or more additional locations.

BRIEF DESCRIPTION OF THE DRAWINGS

A better understanding of the present disclosure can be obtained when the following detailed description of the preferred embodiment is considered in conjunction with the following drawings, in which.

Figure 1:
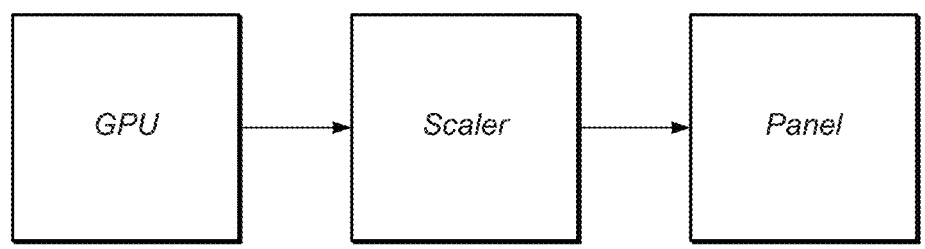
FIG. 1 illustrates a modern display chain, according to the prior art.
Figure 2:
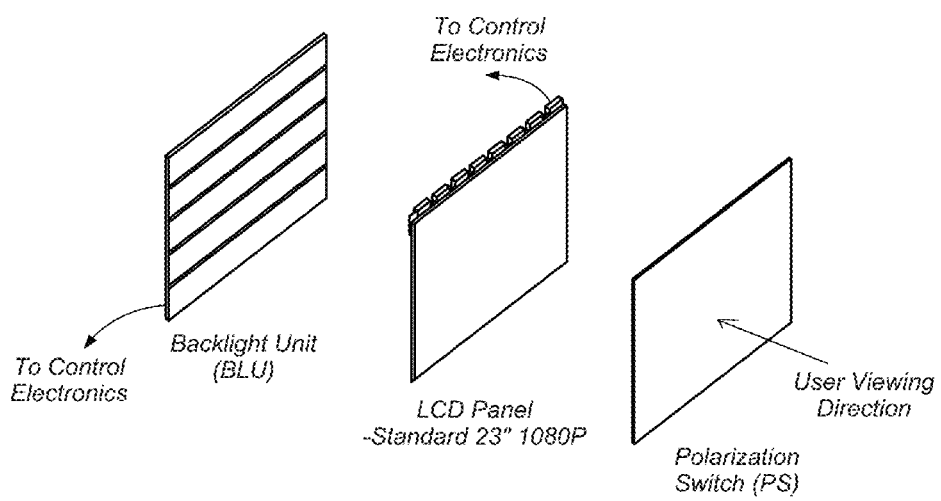
FIG. 2 illustrates an architecture that utilizes a polarization switch, according to the prior art.
Figure 3:
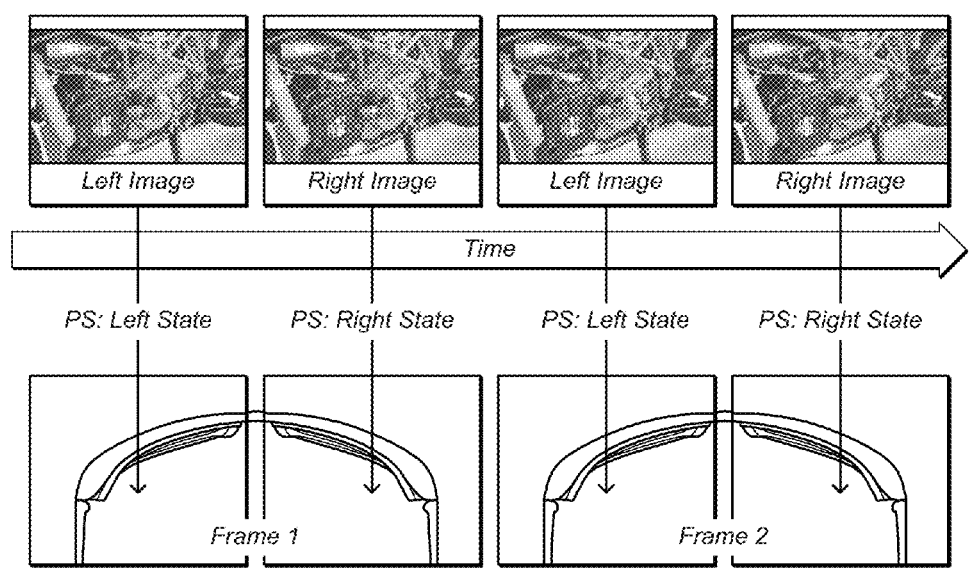
FIG. 3 illustrates a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

This specification includes references to "one embodiment" or "an embodiment."

The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 4:
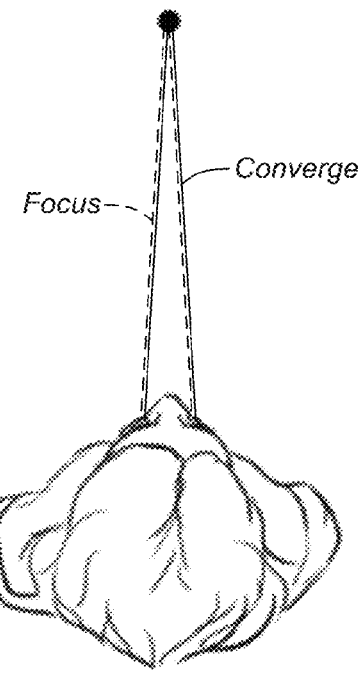
FIG. 4 illustrates a person focusing and converging on an object, according to the prior art.
Figure 5:
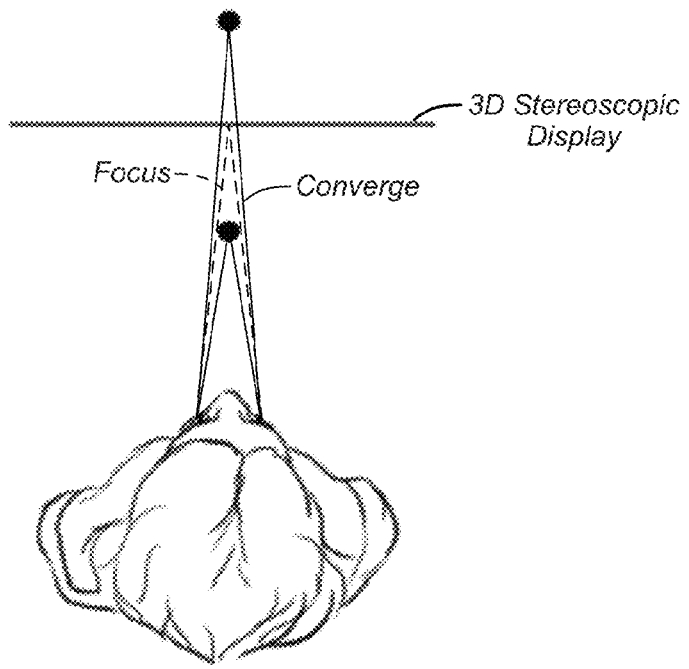
FIG. 5 illustrates a person focusing on a 3D stereoscopic display while converging on virtual content in front of the display, according to the prior art.
Figure 6:
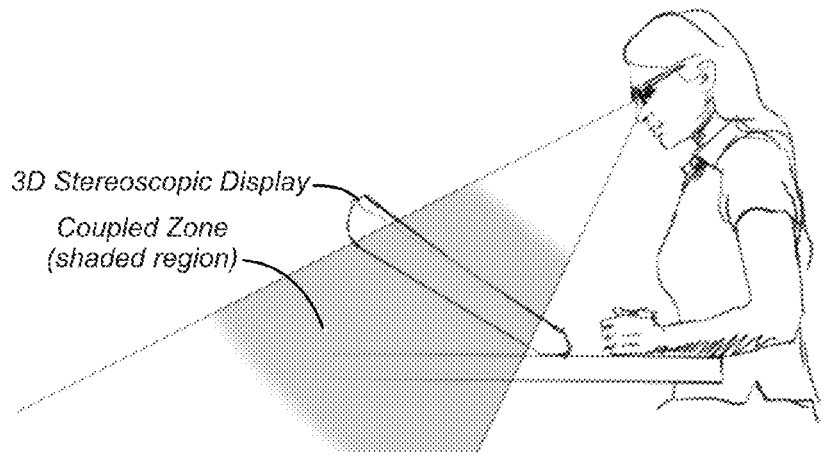
FIG. 6 illustrates a coupled zone of a 3D stereoscopic display, according to the prior art.
Figure 7:
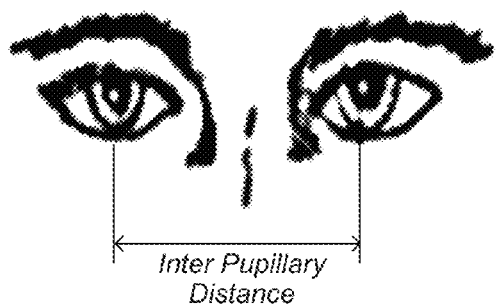
FIG. 7 illustrates interpupillary distance of a user, according to the prior art.
Figure 8:
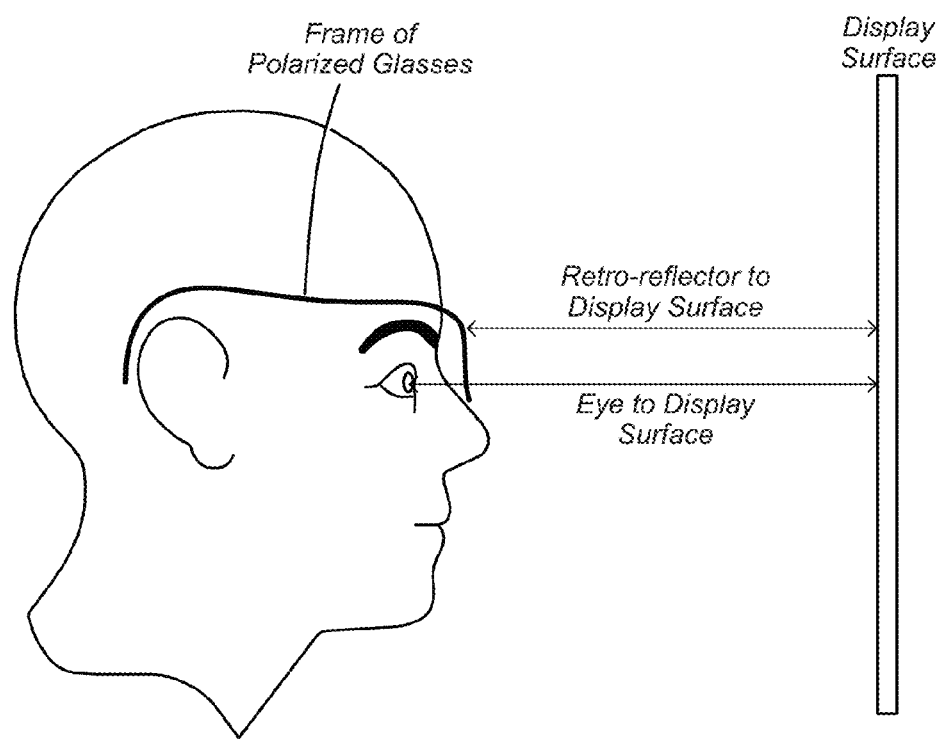
FIG. 8 illustrates distance from a user's eye to a display, according to the prior art.
Figure 9:
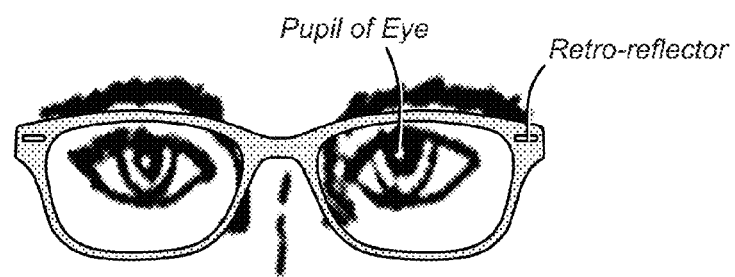
FIG. 9 illustrates the in-plane distance between a user's pupils and retro-reflective targets on eyewear, according to the prior art.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking device (which is identifying and tracking the user's view) identifies the position/orientation of the user's view, and this information is then correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be resealed, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including". As used in the appended claims, this term does not foreclose additional elements, structure, or steps. Consider a claim that recites: "A system comprising a display . . . ": such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

FIGS. 10-14 Exemplary System

Figure 10:
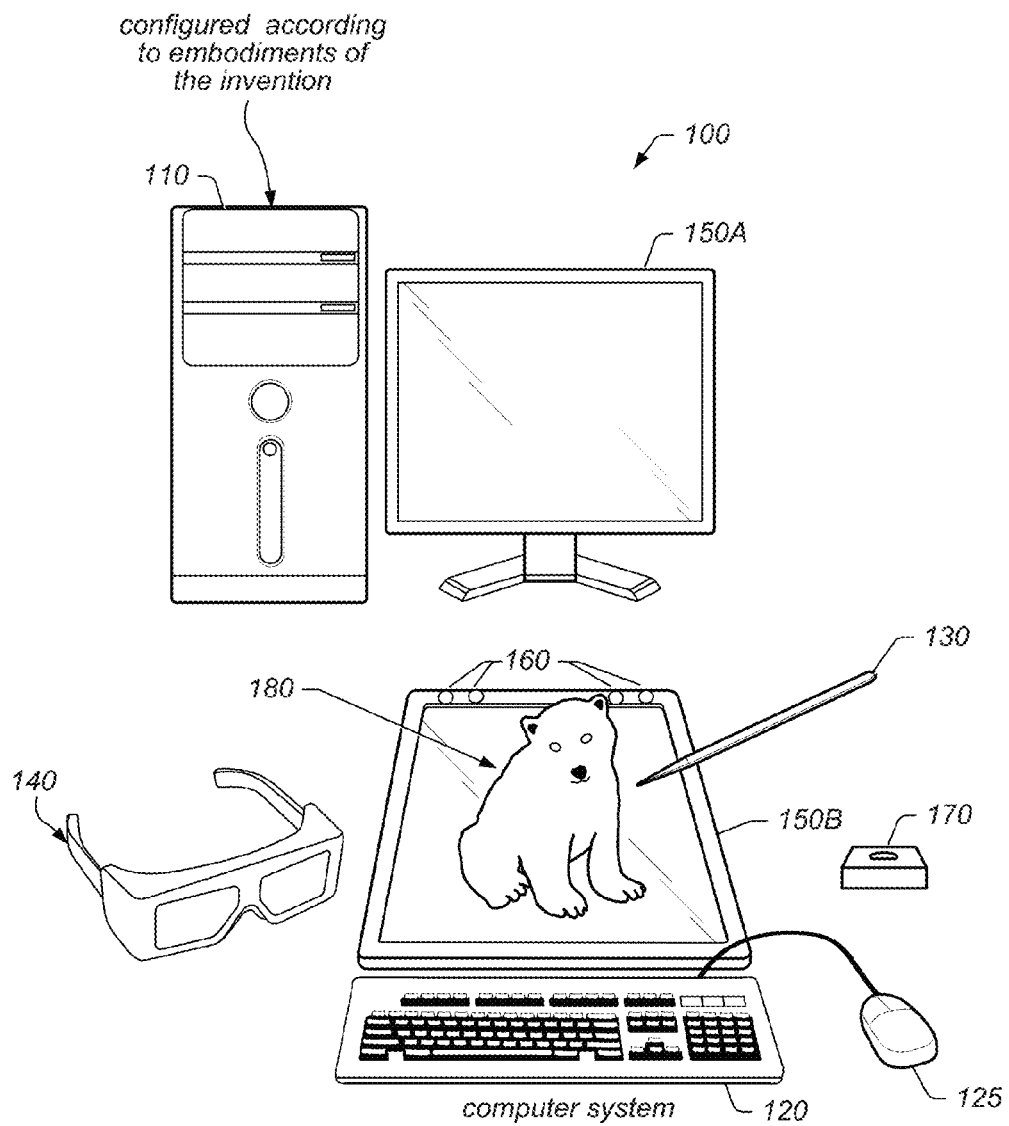
FIG. 10 illustrates a 3D stereoscopic display system configured according to embodiments of the invention.

FIG. 10 illustrates an exemplary system configured to implement various embodiments of the techniques described below.

In the exemplary embodiment of FIG. 10, computer system 100 may include chassis 110, display 150A and display 150B (which may collectively be referred to as display 150 or "at least one display" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to a displayed a portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 10 is exemplary only, and other numbers of displays are also envisioned. For example, the computer system 100 may include only a single display or more than two displays, or the displays may be arranged in different manners than shown. In this particular embodiment, the display 150A is configured as a vertical display (which may be perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D since the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position, orientation, etc.) that is usable to determine the position and orientation of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position and/or orientation data suitable for the head tracking. The input device(s), such as a keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position/orientation of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with "open space" portions of the 3D scene. Thus, at least a portion of the 3D scene may be presented in this "open space", which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is not in "open space". Thus, "open space" refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, "open space" may be considered to be a "hands-on volume" as opposed to an "inner-volume", which may be under the surface of the display(s), and thus not accessible. Thus, the user may interact with virtual objects in the open space because they are proximate to the user's own physical space. Said another way, the inner volume is located behind (or under) the viewing surface, and so presented objects appear to be located inside (or on the back side of) the physical viewing device. Thus, objects of the 3D scene presented within the inner volume do not share the same physical space with the user and the objects therefore cannot be directly and physically manipulated by hands or hand-held tools such as user input device 130. Rather, they may be manipulated indirectly, e.g., via a computer mouse, a joystick, or virtual representations of hands, handheld tools, or a stylus.

In some embodiments, system 100 may include one or more sensors 160. The one or more sensors 160 may be included in a point of view (POV) tracking system. FIG. 10 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Sensors 160 may be used to image a user of system 100, track a user's movement, or track a user's head or eyes, among other contemplated functions. In one embodiment, cameras 160 may track a position and/or an orientation of user input device 130. The information regarding the position and/or orientation of the user input device 130 provided by the one or more sensors 160 may be used in conjunction with other positional information of the system (e.g., an accelerometer and/or gyroscope within the stylus itself) to perform more precise 3D tracking of the stylus 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store user input device 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive image data over the network from a system similar to system 100. In other embodiments, a POV tracking system may include cameras 160. Cameras 160 may be configured to provide visual information regarding a user such that a POV, e.g., the position and orientation, of the user may be determined. However, it should be noted that any type of various POV tracking techniques or devices may be used as desired. Note that as used herein, point of view (POV) of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three position coordinates and three orientation coordinates, although any POV may be used as desired, e.g., three position coordinates and two or three orientation coordinates, and so forth.

Note that in some embodiments, the POV tracking system may rely at least in part on the components of chassis 110 to determine the POV, e.g., via execution of one more programs by or on a processor or functional unit of chassis 110, although in other embodiments the POV tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a POV tracking system at a remote location. The information regarding the POV may indicate a position and/or orientation of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit to ensure proper mapping of the peripheral device to the display images and proper mapping between the projected images and the virtual images stored in the memory of the chassis 110.

Thus, the system 100 may present a 3D scene which the user may interact with in real time. The system may comprise real-time electronic display(s) 150 that may present or convey perspective images in the open space, and a peripheral device 130 that may allow the user to interact with the 3D scene with hand controlled or hand-held tools. The system 100 may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100 is shown as including horizontal display 150B since it simulates the user's visual experience with the horizontal ground; other viewing surfaces may offer a similar 3D illusion experience. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

Figure 11:
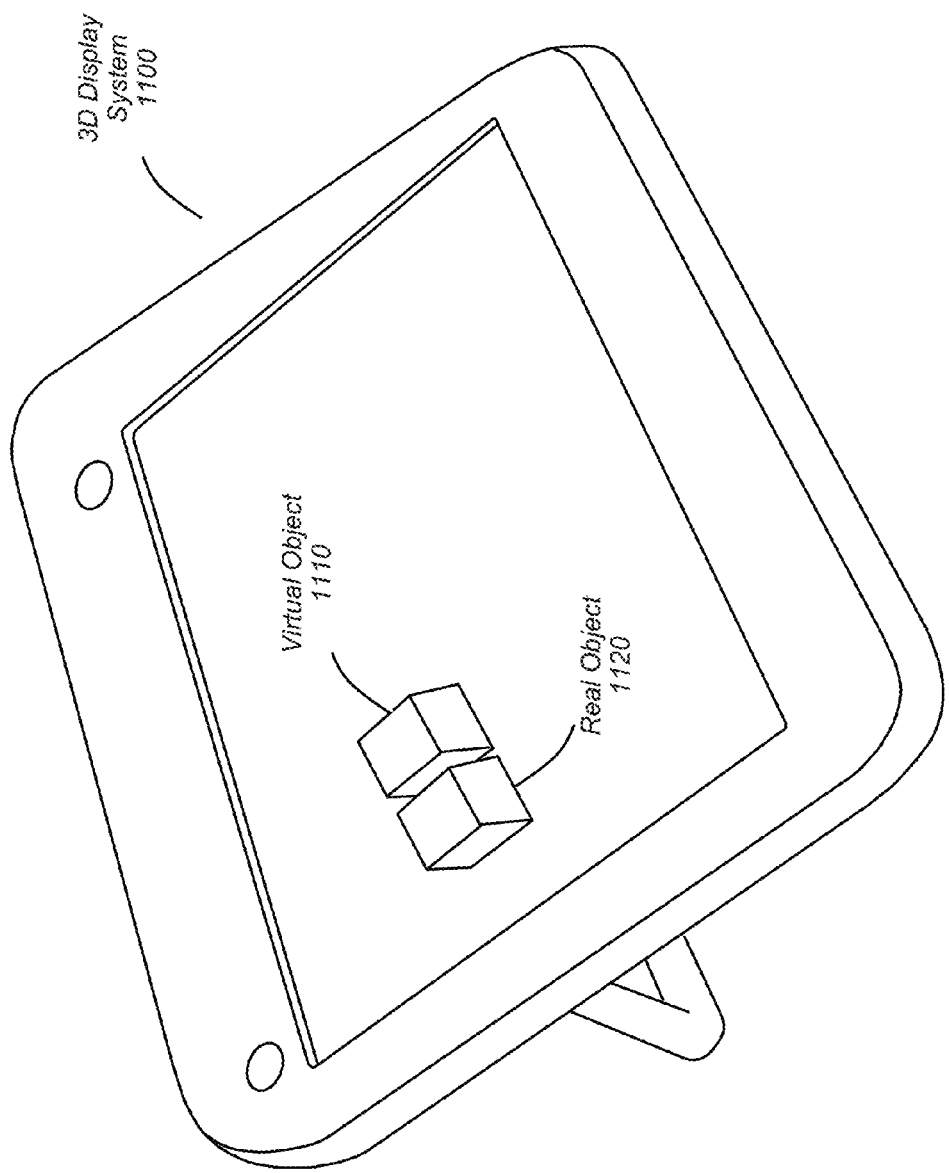
FIG. 11 illustrates one embodiment of the invention using an opaque real object.

Thus, as illustrated in FIG. 11, 3D display system 1100 may be similar to or the same as system 100 described above. In particular, 3D display system 1100 may include at least one display, such as display 1105. In certain embodiments, display 1105 may be substantially horizontal. In other words, display 1105 may be positioned at or near 90 degrees from vertical, for example, between 89-91 degrees, or 85-95 degrees, or any variation which allows a physical object to be rested on the display without disturbance from gravity.

3D display system 1100 may include a processor, or functional unit, which may be coupled to display 1105. The processor, or functional unit, may be configured to render virtual object 1110 on display 1105. Virtual object 1110 may be rendered as a 3D virtual object and may be geometrically similar to physical object 1120 that may be placed on display 1105, i.e., may have the same shape but possibly a different size. In other words, virtual object 1110 may have the same nominal, or approximate, geometrical size and shape as physical object 1120 and may appear to the user of 3D display system 1100 as a 3D object positioned on the display 1105. Note that physical object 1120 may be placed at any location on display 1105 and may be at least partially opaque. In one embodiment, virtual object 1110 may be presented, or rendered, using head tracking data from a head tracking system as described above in reference to FIG. 10. Additionally, in response to user input, a dimension of virtual object 1110 may be adjusted such that the dimension may be approximately the same as a corresponding dimension of physical object 1120. For example, the user may then use a user input device, such as user input device 130 described above, to select and drag the height of virtual object 1110 to be equal, or approximately equal, to the height of real object 1120. This type of adjustment may be performed for other dimensions of the objects as well. In one embodiment, multiple dimensions of the virtual object may be adjusted at the same time, e.g., by dragging a vertex in multiple dimensions, e.g., much like dragging the corner of a 2D user interface window diagonally increases or decreases the size of the window while maintaining the aspect ratio of the window.

Thus, aspects of the initial virtual object may be determined by the system, i.e., the processor (or functional unit), based on information obtained by the head tracking system through use of retro-reflectors that may be included on glasses worn by a user. Accordingly, adjustments to achieve coincidence, or approximate coincidence, between the physical and virtual objects may be made based on the user's visual judgment and preferences. This procedure may, therefore, be used to calibrate the system to the user's viewing comfort preferences.

Further, in one embodiment, the processor may be configured to adjust the dimension of virtual object 1110 after a user has adjusted the orientation and/or position of virtual object 1110 or physical object 1120, or both virtual object 1110 and physical object 1120 such that the objects are approximately, or nominally, adjacent to each other with approximately, or nominally, the same orientation.

In certain embodiments, real object 1120 may be placed at multiple locations on display 1105 and virtual object 1110 may be rendered at each of the multiple locations. Thus, the procedure described above may be repeated at each of the locations, allowing for a more precise calibration of display 1105 with respect to the user's viewing comfort preferences.

Figure 12:
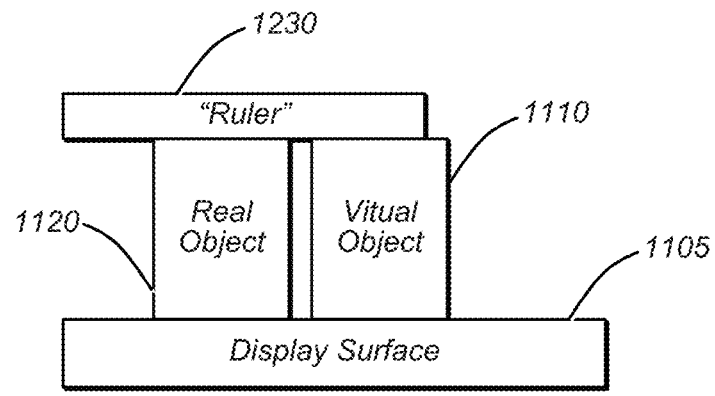
FIG. 12 illustrates an embodiment of the invention using an opaque real object.
Figure 13:
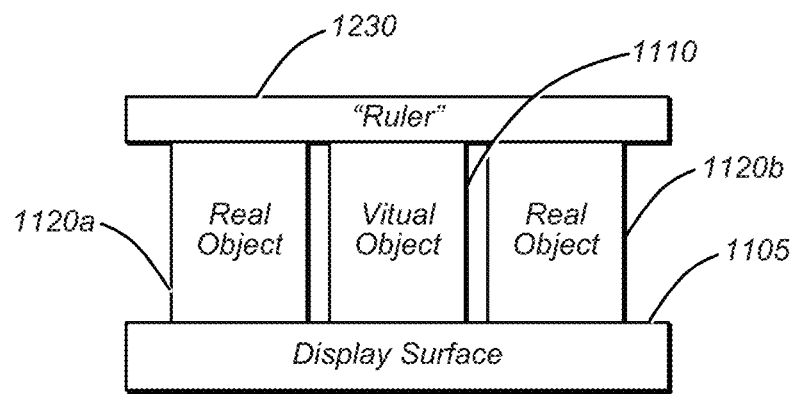
FIG. 13 illustrates yet another embodiment of the invention using an opaque real object.

As illustrated in FIGS. 12-13, once objects (e.g., virtual object 1110 and real object 1120, 1120a-b) are positioned and/or oriented on display 1105, another object, such as ruler 1230 may be placed on real object(s) 1120. Ruler 1230 may be used as an aid to the user in determining the adjustment of the height of virtual object 1110 such that the height of virtual object 1110 is approximately equivalent to that of real object(s) 1120. Note that, as shown in FIG. 13, virtual object 1110 may be positioned and/or oriented between real objects 1120a-b. The use of an additional real object may aid the user in adjustment of dimensions of virtual object 1110.

Figure 14:
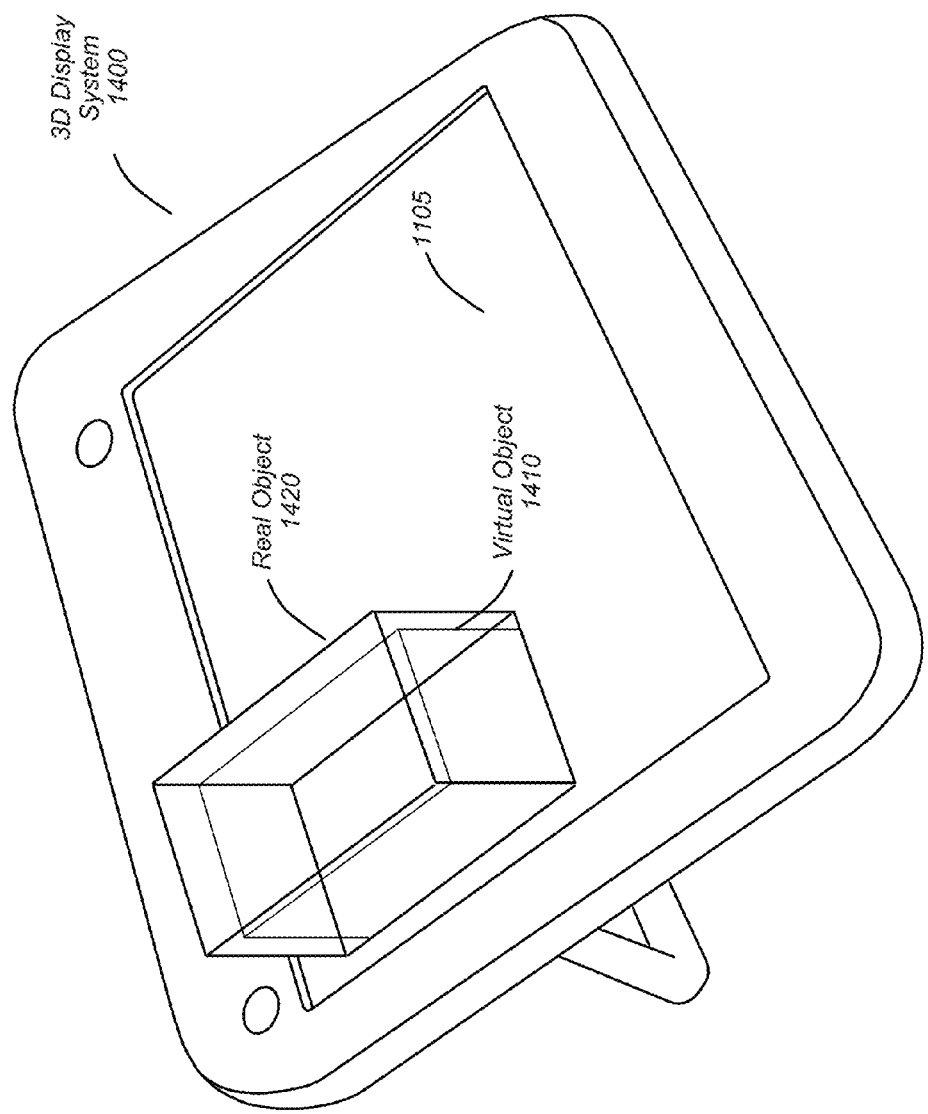
FIG. 14 illustrates one embodiment of the invention using a wireframe real object.

FIG. 14 illustrates a further embodiment of the invention. FIG. 14 illustrates 3D display system 1100 similar to the embodiments described above. Thus, 3D display system 1100 may include a display 1105 and one or more processors, or functional units, coupled to display 1105. Similarly, as described above, the processor(s) may be configured to render a virtual object 1410 as a 3D virtual object. Furthermore, virtual object 1410 may be geometrically similar to real object 1420 placed on display 1105, i.e., may have the same shape but possibly a different size. Real object 1420 may be a wireframe, and thus, allow the user to "see through" real object 1420. Therefore, the user may superimpose virtual object 1410 over real object 1420 by aligning a vertex of virtual object 1410 with a corresponding vertex of real object 1420 as shown. Thus, a vertex of virtual object 1410 may be substantially coincident with the corresponding vertex of real object 1420. The processor may adjust a dimension of the virtual object in response to user input dragging another vertex of virtual object 1410 such that the other vertex of virtual object 1410 is substantially coincident with a corresponding other vertex of real object 1420.

Note that real object 1420 may be placed anywhere on display 1105. Additionally, head tracking data may be used by 3D display system 1100 to render, or present, virtual object 1410, i.e., a virtual wireframe prism, that may have the same nominal geometrical size and shape as real object 1410. Further, a user may use a user input device such as user input device 130 described above to superimpose virtual object 1410 over real object 1420 such that one of the vertices of virtual object 1410 is coincident, or substantially, or approximately, coincident, with the corresponding vertex of real object 1420.

According to one embodiment, the user may use a user input device such as user input device 130 described above to select and drag a second vertex of virtual object 1410 to the approximate position of the corresponding vertex of real object 1420. Dragging the second vertex may scale the entire virtual object, as noted above. Alternatively, the user may repeat the dragging for each of the remaining vertices of virtual object 1410.

Note that in the above described embodiments, aspects of the initial virtual object, i.e., virtual objects 1110 and 1410, may be determined by the system, i.e., 3D display system 1100, based on information obtained by a head tracking system, included in or coupled to the system, via use of retro-reflectors that may be included on glasses (or other headgear) associated with or included in 3D display system 1100. Thus, adjustments to achieve coincidence between the physical and virtual objects may be made based on a user's visual judgment and preferences. Accordingly, the system may be calibrated to the user's viewing comfort preferences. Additionally, the system may also be calibrated to achieve a 1:1 geometrical correspondence between the virtual and physical world throughout the entire comfort zone of a user via various of the above described techniques.

Further, it should be noted that the head tracking system, in addition to determining position by use of the retro-reflectors that may be mounted on glasses worn by a user, may also have a capability to determine the positions of the user's pupils. This information may be used to provide initial calibration/adjustment capability to a stereoscopic display system. The availability of such an initial calibration may result in the need for smaller user adjustments during the calibration procedure described above.

In addition, it should be noted that some 3D display systems are auto-stereoscopic. It is most common for displays of this type to be based on well-known lenticular or parallax barrier technologies. The embodiments described above may also be applied to these (as well as other types of) auto-stereoscopic display systems. Such systems may or may not have a head tracking capability.

Thus, in one embodiment, a physical object may be placed on a surface of an auto-stereoscopic display. The user may assume a position within the viewing zone and through the use of any form of user input device, the image pairs presented on the auto-stereoscopic may be adjusted until the real and virtual images are made coincident and equivalent from the viewer's point of view.

Similarly, the embodiments described above may be used to adjust and calibrate a stereoscopic head mounted display (HMD) system. In such an embodiment, a separate display may be used to present one image of a stereo pair exclusively to each of the user's eyes. For example, a "glasses" type system that may have a separate display for each eye. The HMD may include the capability to sense the user's head position and orientation and may thus provide a form of user input. In addition to an "auxiliary" device (user input device), user input may be received via gesture recognition or voice control. Additionally, in the case of an augmented reality HMD, the display may be transparent and the video image may be overlaid onto the view of the real world. In such an embodiment, the physical, or real, object may be placed at a convenient position in the real world, for example, on a table top. The HMD may then create a nominally equivalent virtual object. The objects may be made coincident as described above in response to input from the user.

Note that in the case of a virtual reality HMD the video image may be overlaid on a view of the real world captured by forward looking cameras built into the HMD. The objects may be made coincident as described above via input from the user.

An alternative calibration method for a virtual reality HMD may include the system displaying a series of virtual target features. The targets may be aligned horizontally and spaced by a known and precise angular separation. A reticle may be presented coincident with, for example, the leftmost target. As the user rotates his or her head about a vertical axis of rotation, the system may adjust the positions of the targets such that the targets remain fixed in virtual space. In one embodiment, sensors included in the HMD system may measure the amount of rotation required by the user to move the reticle to the next target. This degree of rotation may be system/user specific and may be compared to the angular separation produced by the system. Any difference may represent a correction factor. The process may also be performed along the vertical axis.

Figure 15:
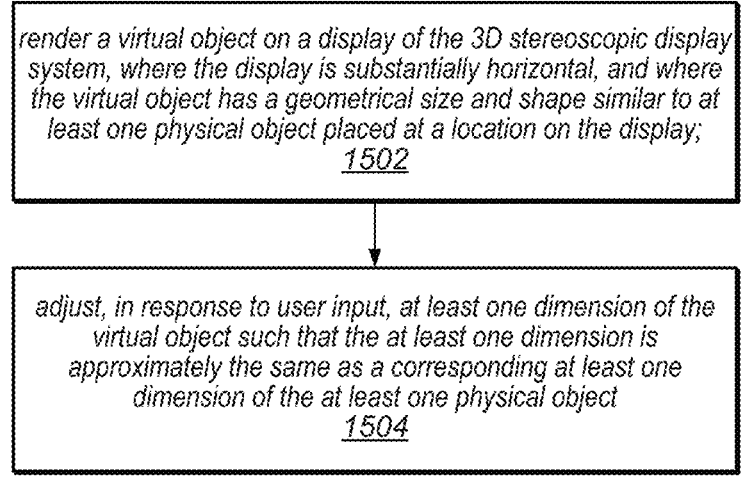
FIG. 15 illustrates a block diagram of a method according to embodiments of the invention.

FIG. 15: Block Diagram of a Method for Performing Calibration

FIG. 15 illustrates an exemplary embodiment of a computer implement method for calibrating a three dimensional (3D) stereoscopic display system. The method shown in FIG. 15 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1502, a virtual object may be rendered on a display of a 3D stereoscopic display system. In one embodiment, the display may be substantially horizontal and the virtual object may be geometrically similar to one or more physical objects placed at a location on the display, i.e., may have the same shape but possibly a different size as the physical objects.

Note that the physical object, in one embodiment, may be at least partially opaque. In another embodiment, the physical object may be a wireframe, and therefore, may be partially transparent. In one embodiment, the 3D stereoscopic display system may include or be coupled to a head tracking system and the virtual object may be rendered based on tracking of the position and orientation of a user (e.g., the user's head or eyes).

At 1504, at least one dimension of the virtual object may be adjusted in response to user input. The adjustment may be such that the at least one dimension of the virtual object is approximately the same as a corresponding at least one dimension of the physical object(s). In one embodiment, the adjustment may be performed after a user has adjusted orientation and/or position of the physical object(s), the virtual object, or both, such that the virtual object and physical object are approximately adjacent with approximately the same orientation.

In one embodiment, the one or more physical objects may be two identical physical objects. In such embodiments, the adjustment may be performed after a user has adjusted orientation and/or position of the two identical physical objects or the virtual object such that the virtual object is between the two identical physical objects, and each of the two identical physical objects is approximately adjacent to the virtual object with approximately the same orientation. In other words, the user may position the virtual object between the two identical physical objects and substantially align the three objects.

In one embodiment, the user may superimpose the virtual object over the physical object by aligning a vertex of the virtual object with a corresponding vertex of the physical object. Thus, a vertex of the virtual object may be substantially coincident with the corresponding vertex of the physical object. The method may adjust a dimension of the virtual object in response to user input dragging another vertex of the virtual object, such that the other vertex of the virtual object is substantially coincident with a corresponding other vertex of the physical object.

In an exemplary embodiment where the physical object is a wireframe (construction), the adjustment may be performed after a user has adjusted orientation and/or position of the wireframe or the virtual wireframe such that the virtual wireframe is superimposed over the physical wireframe. In other words, a vertex of the virtual wireframe may be substantially coincident with a corresponding vertex of the physical wireframe, e.g., where corresponding first vertices of each are substantially coincident. In such embodiments, adjustment of the dimension of the virtual object may include scaling the virtual wireframe in response to user input dragging a second, or other, vertex of the virtual wireframe such that the second or other vertex is substantially coincident with a corresponding second or other vertex of the physical wireframe (object). Alternatively, only one dimension may be adjusted by dragging the second vertex. In such embodiments, the user may drag each additional vertex to adjust corresponding additional dimensions.

In further embodiments, the location of the physical object may be a first location, for example, the center of the display, and the method may further include repeating rendering and adjusting the virtual object for each of one or more additional locations. For example, the rendering and adjusting of the virtual object may be performed in each corner of the display in addition to the center of the display.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for calibrating a three dimensional (3D) stereoscopic display system, comprising: a computer performing:
   rendering a virtual object on a display of the 3D stereoscopic display system, wherein the display is substantially horizontal, wherein the virtual object comprises a virtual model of at least one physical object placed at a location on a surface of the display, and wherein the virtual object is geometrically similar to the at least one physical object; and
   adjusting, in response to user input, at least one dimension of the virtual object such that the at least one dimension is approximately the same as a corresponding at least one dimension of the at least one physical object.

2. The computer-implemented method of claim 1, wherein said adjusting is performed after a user has adjusted orientation and/or position of at least one of the physical object or the virtual object such that the virtual object and physical object are approximately adjacent with approximately the same orientation.

3. The computer-implemented method of claim 1, wherein the at least one physical object comprises two identical physical objects, and wherein said adjusting is performed after a user has adjusted orientation and/or position of the two identical physical objects or the virtual object such that the virtual object is between the two identical physical objects and each of the two identical physical objects is approximately adjacent to the virtual object with approximately the same orientation.

4. The computer-implemented method of claim 1, wherein the at least one physical object is a physical wireframe, wherein the virtual object is a virtual wireframe, and wherein said adjusting is performed after a user has adjusted orientation and/or position of the wireframe or the virtual wireframe such that the virtual wireframe is superimposed over the physical wireframe, and a vertex of the virtual wireframe is substantially coincident with a corresponding vertex of the physical wireframe.

5. The computer-implemented method of claim 4, wherein said adjusting at least one dimension of the virtual object comprises:
   scaling the virtual wireframe in response to user input dragging another vertex of the virtual wireframe such that the other vertex is substantially coincident with a corresponding other vertex of the physical wireframe.

6. The computer-implemented method of claim 1, wherein the location is a first location, and wherein the method further comprises:
   repeating said rendering and said adjusting for each of one or more additional locations.

7. The computer-implemented method of claim 1, further comprising:
   the computer performing tracking position and orientation of a user, wherein the virtual object is rendered based on said tracking.

8. A non-transitory computer readable memory medium storing program instructions executable by a processor to:
   render a virtual object on a display of a 3D stereoscopic display system, wherein the display is substantially horizontal, and wherein the virtual object comprises a virtual model of at least one physical object placed at a location on a surface of the display, and wherein the virtual object is geometrically similar to the at least one physical object; and
   adjust, in response to user input, at least one dimension of the virtual object such that the at least one dimension is approximately the same as a corresponding at least one dimension of the at least one physical object.

9. The non-transitory computer readable memory medium of claim 8, wherein the program instructions are further executable by a processor to perform said adjusting after a user has adjusted orientation and/or position of at least one of the physical object or the virtual object such that the virtual object and physical object are approximately adjacent with approximately the same orientation.

10. The non-transitory computer readable memory medium of claim 8, wherein the at least one physical object comprises two identical physical objects, and wherein the program instructions are further executable by a processor to perform said adjusting after a user has adjusted orientation and/or position of the two identical physical objects or the virtual object such that the virtual object is between the two identical physical objects, and each of the two identical physical objects is approximately adjacent to the virtual object with approximately the same orientation.

11. The non-transitory computer readable memory medium of claim 8, wherein the at least one physical object is a physical wireframe, wherein the virtual object is a virtual wireframe, and wherein the program instructions are further executable by a processor to perform said adjusting after a user has adjusted orientation and/or position of the wireframe or the virtual wireframe such that the virtual wireframe is superimposed over the physical wireframe, and a vertex of the virtual wireframe is substantially coincident with a corresponding vertex of the physical wireframe.

12. The non-transitory computer readable memory medium of claim 11, wherein to adjust at least one dimension of the virtual object, the program instructions are further executable by the processor to:
   scale the virtual wireframe in response to user input dragging another vertex of the virtual wireframe such that the other vertex is substantially coincident with a corresponding other vertex of the physical wireframe.

13. The non-transitory computer readable memory medium of claim 8, wherein the location is a first location, and wherein the program instructions are further executable by the processor to:
   repeat said rendering and said adjusting for each of one or more additional locations.

14. The non-transitory computer readable memory medium of claim 8, wherein the program instructions are further executable by the processor to:
   track position and orientation of a user, wherein the virtual object is rendered based on said tracking.

15. A system, comprising:
   at least one display;
   a processor coupled to the at least one display; and
   a memory, coupled to the processor, wherein the memory stores program instructions executable by the processor to:
      render a virtual object on a display of a 3D stereoscopic display system, wherein the at least one display is substantially horizontal, and wherein the virtual object comprises a virtual model of at least one physical object placed at a location on a surface of the display, and wherein the virtual object is geometrically similar to the at least one physical object; and adjust, in response to user input, at least one dimension of the virtual object such that the at least one dimension is approximately the same as a corresponding at least one dimension of the at least one physical object.

16. The system of claim 15, wherein the program instructions are further executable by the processor to perform said adjusting after a user has adjusted orientation and/or position of at least one of the physical object or the virtual object such that the virtual object and physical object are approximately adjacent with approximately the same orientation.

17. The system of claim 15, wherein the at least one physical object comprises two identical physical objects, and wherein the program instructions are further executable by the processor to perform said adjusting after a user has adjusted orientation and/or position of the two identical physical objects or the virtual object such that the virtual object is between the two identical physical objects such that each of the two identical physical objects is approximately adjacent to the virtual object with approximately the same orientation.

18. The system of claim 15, wherein the at least one physical object is a physical wireframe, wherein the virtual object is a virtual wireframe, and wherein the program instructions are further executable by the processor to perform said adjusting after a user has adjusted orientation and/or position of the wireframe or the virtual wireframe such that the virtual wireframe is superimposed over the physical wireframe, and a vertex of the virtual wireframe is substantially coincident with a corresponding vertex of the physical wireframe.

19. The system of claim 18, wherein to adjust at least one dimension of the virtual object, wherein the program instructions are further executable by the processor to:

scale the virtual wireframe in response to user input dragging another vertex of the virtual wireframe such that the other vertex is substantially coincident with a corresponding other vertex of the physical wireframe.

20. The system of claim 15, wherein the location is a first location, and wherein the program instructions are further executable by the processor to:

repeat said rendering and said adjusting for each of one or more additional locations.

21. The system of claim 15, further comprising:

a head tracking system coupled to the processor;

wherein the program instructions are further executable by the processor to:

track position and orientation of a user via the head tracking system, wherein the virtual object is rendered based on said tracking.

* * * * *